Nov. 28, 1967 L. C. MILLER 3,355,716

MEMORY CONTROL AND ACCESS SYSTEM

Filed April 2, 1965 2 Sheets-Sheet 1

INVENTOR.
LEO C. MILLER
BY
Claude Funkhouser
ATTORNEY

INVENTOR.
LEO C. MILLER
BY
Claude Funkhouser
ATTORNEY 3,355,716
MEMORY CONTROL AND ACCESS SYSTEM Leo C. Miller, Silver Spring, Md., assignor to the United States of America as represented by the Secretary of the Navy Filed Apr. 2, 1965, Ser. No. 445,275
27 Claims. (Cl. 340—172.5)

ABSTRACT OF THE DISCLOSURE

An access system for a magnetic memory composed of a plurality of serially connected memory planes, wherein said access system is capable of interrogating a plurality of memory planes upon receipt of commands from an instruction program punched on paper tape. Bi-directional current steering switches are employed in the memory interrogation for effecting diagonal word scanning rather than bit sequential scanning; and inhibit circuitry is employed in the system for neutralizing all memory planes save for the desired information-holding plane. Additionally, a portion of the magnetic memory serves as an arithmetic register, eliminating the need for plural external arithmetic registers.

This invention relates in general to magnetic memories and, more particularly, to a magnetic memory utilizing a program control system employing a punched paper tape as its source of instructions.

The operation of a general purpose computer is normally controlled by what is called a program. The program determines what information is required from the computer memory, tells where it is located within the memory, and provides instructions as to the operations which must be performed with the information in solving a problem. However, it is usually desirable that these computers operate at very high speeds. Therefore, the programs must be electronic in their nature, equaling the speed of the computer.

Special purpose low speed computers can be effectively controlled by information of a paper tape. Electronic programming is not required in such low speed computers because the paper tape input control system is capable of sustaining the instruction requirements of the special purpose computer. Additionally, the use of such an input system renders the entire memory control function a relatively simple operation.

Furthermore, the paper tape can be used as a source of numerical information throughout the program. Provisions are made to gate this information directly to a single external register used in conjunction with the magnetic memory.

The access system for the memory planes will consist of bi-directional current steering switches on each axis of the memory. These switches are described in a commonly assigned copending application of James A. Perschy, entitled Bi-Directional Current Steering Switch, filed Oct. 30, 1963 and bearing Ser. No. 320,238, now Patent No. 3,296,604. The bi-directional current steering switch therein described is used on both axes to effect a diagonal scan of a memory word. That is, once the correct starting position has been ascertained on one axis both switches begin to advance sequentially, giving the effect of a diagonal scan.

Usually in magnetic core memory systems, a memory is interrogated bit by bit in the search for the desired information. This invention contemplates a method of locating the desired information not by advancing bit by bit but row by row of all the memory planes, at the same time, under the control of the bi-directional current steering switches.

Additionally, the present invention allows the connection of all the individual memory planes in series with one pair of bi-directional current steering switches, and the use of an additional inhibiting circuit to select the one plane that contains the desired numerical information. Normally, each memory plane has its own access system and the memory plane interrogated contains the desired information. Actually, the full potentiality of such an access system is not approached because such systems can drive higher numbers of the magnetic cores that comprise the usual memory plane. Normally, in an effort to reduce the access time to the stored information, the size of the memory plane interrogated by a pair of current steering switches is kept small and the working capacity of the current steering switches is never attained. However, extra current steering switch assemblies are required for all the additional memory planes needed to attain a large memory storage capacity and, at the same time, to enjoy a short access time. Using one access system in interrogating as many as eight or more memory planes approaches the full potentiality of such an access system as the bi-directional current steering access system. However, using one access system extensively raises the requirement of a further selective process. That is, the desired information is contained in only one of the eight interrogated memory planes. This selective process is accomplished by momentarily neutralizing the interrogation signals in all but the one correct memory plane. This access system will combine with the neutralizing system for producing a simplified memory control system having a reduced number of components, yet keeping its short access time.

One object of the present invention, therefore, resides in the provision of an improved memory program control system employing a paper tape input system as its source of instructions.

Another object of the invention is to provide a memory control circuit employing a "word" counting access system to reduce access time.

A further object of the invention is to reduce the required number of components by interrogating all of the individual memory planes by one pair of bi-directional current steering switches.

Other objects and many of the attendant advantages of the present invention will be readily appreciated as the same becomes better understood by reference to the following detailed description when considerel in conjunction with the accompanying drawings illustrating one embodiment of the subject invention, wherein.

Briefly, this invention comprises a new technique in the control logic access system of a memory system. More specifically, the operational instructions are contained on a punched paper tape and interrupted one at a time to control the various memory operations. A normal memory operation for the instant invention contains four sequential phases of a single operation. During the first phase of an operation, the memory is instructed as to whether the selected numbers will be added, subtracted, or operated upon in any other manner usually associated with computers. During the second phase, one of the two numbers involved in the forthcoming arithmetic operation will be selected and transferred to a portion of the memory while during the third phase the second number is selected and transferred to an arithmetic register external to the memory. Before the beginning of the fourth phase, the desired arithmetic operation is completed and the result is returned to the selected area of the memory as determined during the fourth phase. These operations are repeated as many times as required to compute the desired answer.

Figure 1:
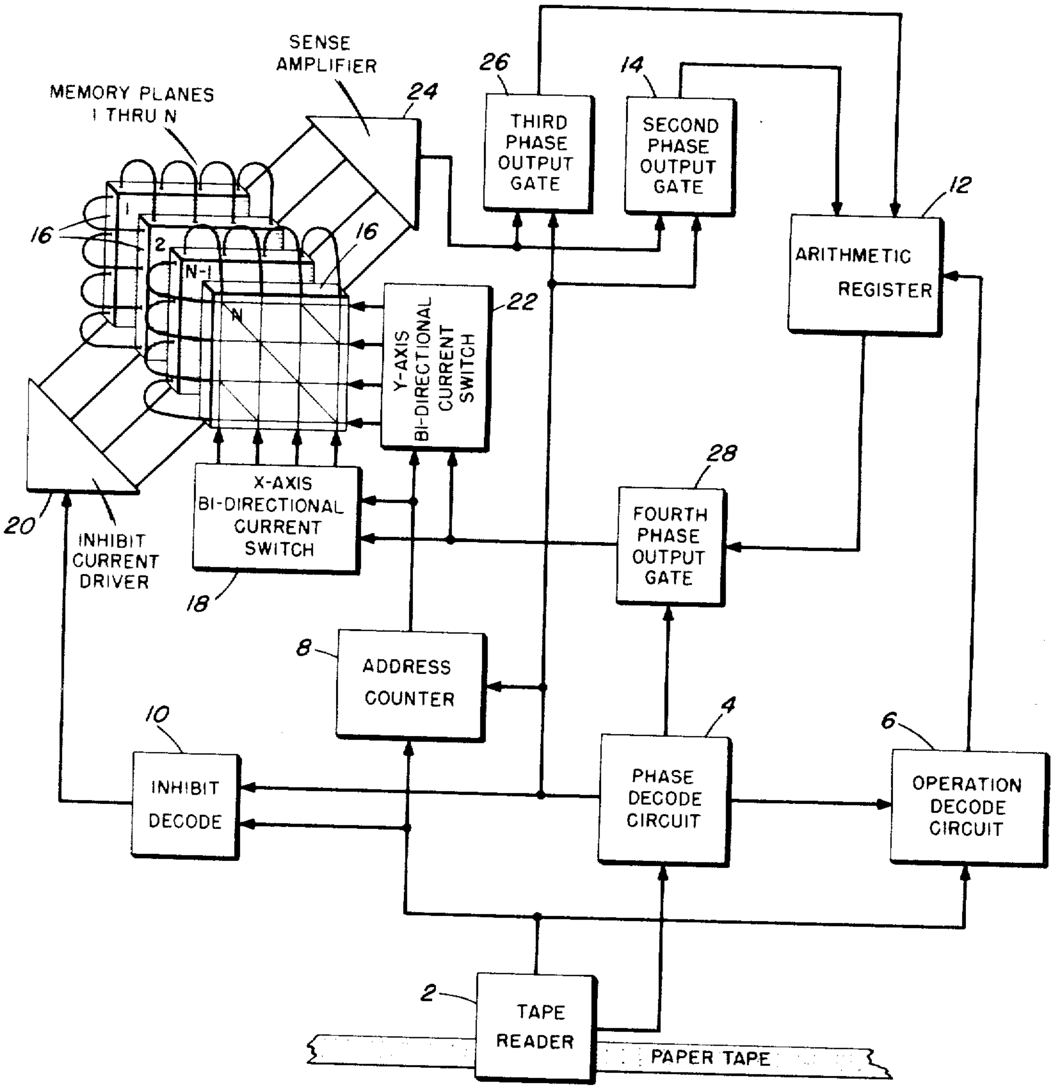
FIG. 1 is a generalized block diagram of the invention.

Referring to FIG. 1, there can be seen a tape reader 2 (model RR–100–D manufactured by the Rheem Manufacturing Co.). The tape reader interprets two classes of signals contained on the paper tape, one of which indicates the beginning of each phase of operation and is applied to a phase decode circuit 4, and the other of which designates either an instruction that is interpreted by the control logic as the step to be performed during that phase of an operation, and is effectively applied to an operation decode circuit 6, or an address which is applied to both an address counter 8 and an inhibit decode circuit 10. The first interpreted signal is applied to the phase decode circuit 4, generating an enabling signal for application to the operation decode circuit 6. The operation decode circuit 6 effectively has two input signals, one of which is an enabling signal during the first phase of operation of each operational period, and the other of which is either an instruction signal from the tape reader for determining what type arithmetic operation will be performed during this operational period, or an address signal. Once the operation decode circuit 6 has been set up to contain the instruction signal, it applies appropriate signals to an arithmetic register 12, enabling the register to perform the selected arithmetic operation when called upon to do so. It is not the purpose of this disclosure to specify the type of arithmetic register employed, for it may be varied to satisfy different design criteria.

The second phase signal from the phase decode circuit 4 is applied as an enabling pulse to a second phase output circuit 14, and to the address counter 8 and the inhibit decode circuit 10, allowing both said counter 8 and said decode circuit 10 to interpret the next instruction signal as an address signal. That is, the location of the first number in a plurality of memory planes 16 is found by selecting one of the memory planes 16 and the one "row" of that plane which contains the first bit of the desired number.

Figure 2:
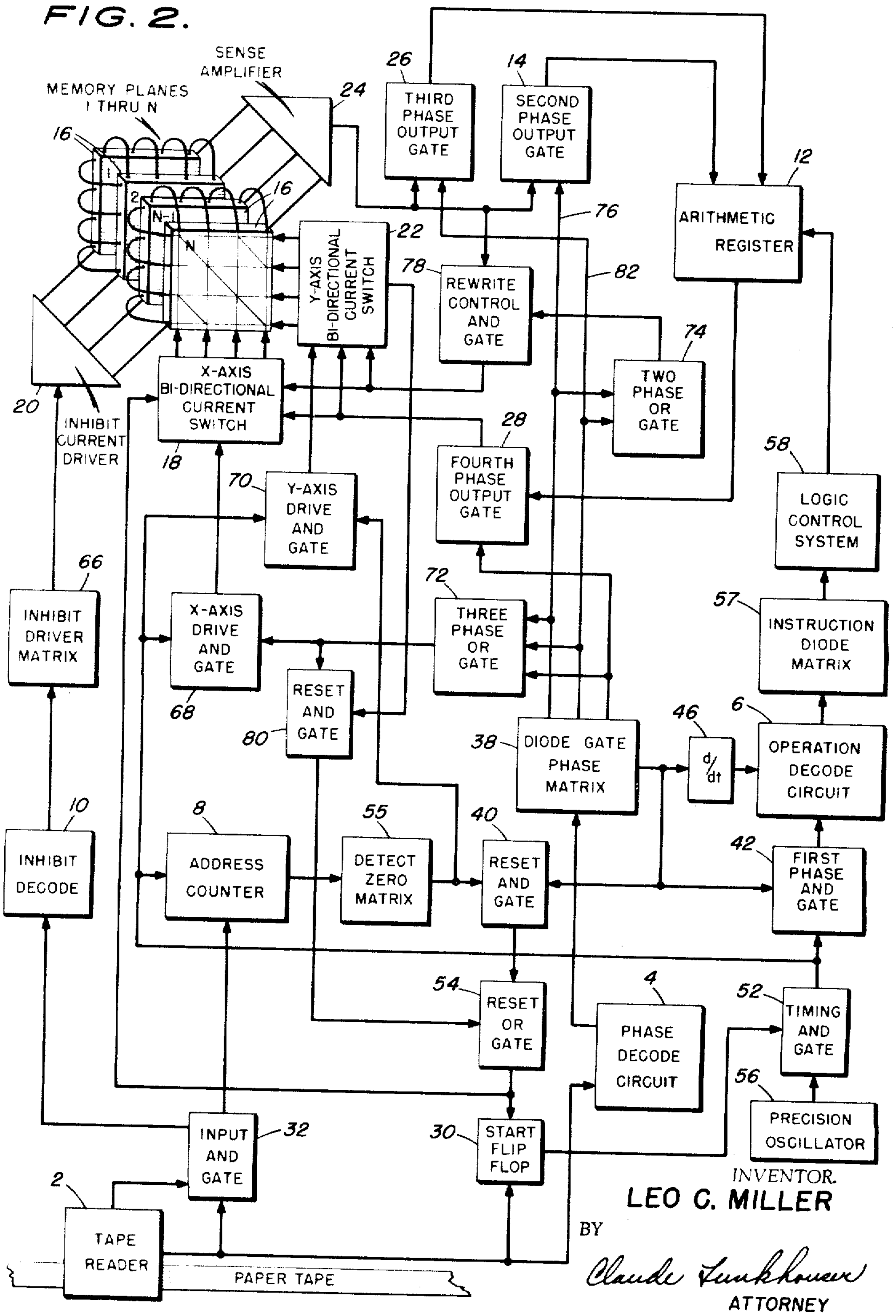
FIG. 2 is a more detailed block diagram of the invention.

For clarity, in the memory planes 16, shown schematically in FIGS. 1 and 2, the lines drawn parallel to the X-axis will be designated "row," whereas those arranged parallel to the Y-axis will be called "columns," and those drawn diagonally will be called "words." Each "word" represents a number to be gated to the arithmetic register 12.

The address counter 8 is set up by the next detected information signal to represent, in binary form, the "row" number of the memory planes 16 which contains the desired number. Simultaneously, the inhibit decode circuit 10 is set up by a part of the same information signal to represent, in binary form, the plane number in which the desired "row" is contained.

While the address counter 8 is advancing an X-axis bi-directional current steering switch 18 for selecting the correct "row" at which to begin interrogation, the inhibit decode circuit 10 energizes an inhibit current driver circuit 20 so as to provide neutralizing currents to all but the selected one of the memory planes 16. Once the address counter 8 has advanced the steering switch 18 to the correct "row," it begins to additionally energize a Y-axis bi-directional current steering switch 22 while continuing to energize the steering switch 18. By causing the two current steering switches 18 and 22 to advance together the selected memory plane has one of its "words" interrogated. This "word" is picked up by a sense amplifier 24 and gated into the arithmetic register 12 through the second phase output circuit 14, and thence to one of the memory registers ending the second phase of an operation. As will be better understood infra, portions of the memory planes 16 are capable of functioning as memory registers thus eliminating the need for additional external registers.

The third phase signal from the phase decode circuit 4 is applied to a third phase output circuit 26, and to said address counter 8, and the inhibit decode circuit 10. A second "word" is selected from the memory planes 16 by the same procedure used to select the first "word." This "word" is then gated through the third phase output circuit 26 into the arithmetic register 12 and the desired computation is performed by the arithmetic logic (not shown) incorporated within said register 12, ending the third phase of operation.

The fourth phase signal from the phase decode circuit 4 is applied to a fourth phase output circuit 28, and to the address counter 8 and the inhibit decode circuit 10. Both the counter 8 and the inhibit decode circuit 10 select an address in one of the memory planes 16 in which the answer contained in the arithmetic register 12 will be placed. The enabling pulse applied to the fourth phase output circuit 28 allows this circuit to control the operation of the switches 18 and 22 so as to write the contents of the arithmetic register 12 into the selected address in the memory planes 16.

The instructions from the tape reader have controlled the operation of the memory system for one step in a mathematical problem. The instructions contained on the prepunched tape are sufficient to carry out the entire solution of the problem. If certain constant numbers are required often during the solution of the problem, provisions exist to insert them directly into the associated arithmetic register 12.

Referring again to FIG. 2, there can be seen the tape reader 2 that is employed in this invention to detect the control and information signals contained on the punched program tape. This tape reader applies the control signals to various circuits for regulating the operation of the memory system. The first signal detected is the tape ready signal of the tape reader 2 and it is applied to the phase decode circuit 4, a start flip-flop 30, and an input "and" gate 32. The phase decode circuit 4 is comprised of two ordinary flip-flop circuits arranged as a one-four counter. A diode gate phase matrix 38, comprised of a plurality of individual diodes, is connected to these flip-flops in the manner usually employed in the computer art for combining the various output waveforms of flip-flops into their four possible time segregated enabling signals. Each of these signals occurs in a sequence corresponding to a tape ready signal detected by the tape reader 2, and controls the operating procedure of the memory system.

The first tape ready signal applied to the phase decode circuit 4 causes a change in the operating state of the first flip-flop in the decode circuit 4. The phase matrix 38 interprets this change to be the beginning of the first phase of operation, and develops an output enabling pulse that is applied to a reset "and" gate 40, a first phase "and" gate 42, and a differentiator circuit 46. The leading edge of the enabling pulse applied to the differentiator 46 is used to reset the operation decode circuit 6 to its starting position.

The tape ready signal is also applied to the start flip-flop 30 driving it to its second stable condition, wherein an enabling pulse is applied to a timing "and" gate 52. The flip-flop 30 has two input signals, one of which receives the tape ready signal from the tape reader 2 at the beginning of each phase of operation, and the other of which receives a reset pulse from a reset "or" gate 54. The input "and" gate 32 has two input signals. The first is an enabling signal from the tape reader 2, and is available whenever information is to be inserted into the memory access system, and the second is the information signal to be gated into the access system. The input "and" gate 32 is actually comprised of eight individual "and" gates, each of which is separately connected to the tape reader 2 and enabled by the tape ready signal, but for purposes of clarity only one such connection is shown.

During the first phase of an operation, the information signal detected by the tape reader is gated through the input "and" gate 32 and applied to the address counter 8. This counter is comprised of six ordinary flip-flop circuits arranged as a binary counter having a capacity of counting from zero to sixty-three. During phase one of an operation, a six-bit signal is simultaneously passed through the individual "and" gates comprising the gate 32 and sets up the address counter to represent any number from zero to sixty-three.

A detect zero diode matrix 55 is connected to the address counter 8. This matrix 55 is comprised of a plurality of diodes which are attached to each flip-flop circuit in the counter 8. These diodes are connected in a manner well-known in the computer art so as to provide an enabling output signal whenever the counter is in its "zero" condition.

The timing "and" gate 52 has two inputs, one of which is an enabling signal from the start flip-flop 30, the other of which is a train of clock pulses from a standard reference oscillator 56. The rate of operation of this oscillator determines the speed of the memory system. The system can operate over a wide range of relatively slow operating rates, but for the purposes of the embodiment of this invention herein disclosed, a rate of 150 kilocycles per second has been chosen.

Since the enabling input from the start flip-flop 30 is at a constant level, the signal passing through the timing "and" gate 52 will comprise the timing pulses from the reference oscillator 56. The timing signals are simultaneously applied to the first phase "and" gate 42 and the address counter 8.

This gate 42 has two inputs, one of which receives an enabling pulse from the phase matrix circuit 38 during phase one, and the other of which is the train of timing pulses gated through the timing "and" gate 52. Simultaneous with the advancement of the address counter 8 by the application of timing pulses from the timing "and" gate 52, the operation decode circuit 6 counts the timing pulses applied thereto from the first phase "and" gate 42.

The operation decode circuit 6 consists of five ordinary flip-flop circuits arranged as a zero to thirty-one counter. An instruction diode matrix 57, comprising a plurality of diodes, is connected to the decode circuit 6. The individual diodes of the matrix 57 are connected to the flip-flops in the decode circuit 6 in a manner well-known in the computer art for combining the various flip-flop output waveforms into thirty-two distinct enabling signals. Thirty-one useful instruction signals, in addition to the reset condition, can be obtained from this matrix. Each signal indicates a separate arithmetic operation that the associated arithmetic register 12 is able to perform. All the operations required of the arithmetic register are well-known to the computer art and can be easily implemented by well-known logic design techniques. These techniques are beyond the scope of this disclosure and therefore will not be herein described. It is sufficient to say that each of the thirty-one enabling signals from the instruction diode matrix 57 is connected to a logic control system 58 so as to indicate the circuitry contained therein that will be used to perform the desired arithmetic operation.

The operation decode circuit 6 has two input signals, one being a reset signal from the differentiator 46, and the other a train of timing pulses from the first phase "and" gate 42. The decode circuit 6 counts all the timing pulses applied thereto. The final count is the complement to the number set up in the addres counter 8 and is decoded in the instruction matrix 57 as the next arithmetic operation to be performed.

The timing pulses applied to the address counter 8 are used to advance the counter from its set position to its binary state representing the numeral zero. When the address counter 8 is advanced to its "zero" condition, the detect zero matrix 55 indicates this condition by causing an output enabling signal to be applied to the reset "and" gate 40.

The reset "and" gate 40 has two input signals, the first of which is an enabling signal from the phase matrix 38, the second being the reset signal from the detect zero matrix 55. The output from the reset "and" gate 40 is applied to the start flip-flop 30 through the reset "or" gate 54, driving it back to its first stable state and thereby removing its enabling output from the timing "and" gate 52. With this enabling input signal removed from the timing "and" gate 52, no more timing signals will be applied to either the address counter 8 or the operation decode circuit 6.

The second tape ready signal from the tape reader 2 alerts the memory system as to the forthcoming instruction, which is the location in the memory of the first number to be transferred to the arithmetic register 12. The second tape ready signal is applied to the start flip-flop 30, the input "and" gate 32 and the phase decode circuit 4 in a manner similarly described as pertaining to the first phase of operation. The input "and" gate 32 is again enabled and allows the information signal from the paper tape to be transferred to the address counter 8. The binary number set up in the address counter 8 represents the "row" in the memory planes 16 in which the first bit of the desired "word" is located.

During phase two of the operation the information signal will set two more flip-flops which comprise the inhibit decode circuit 10. Attached to both sides of the flip-flops in the inhibit decode circuit 10 are a plurality of diodes arranged in a manner usually employed in the computer art for combining the various output waveforms of these flip-flops into a "three out of four" enabling signal for each possible combination of flip-flop conduction states. These diodes form an inhibit driver matrix 66 which is used to select the one memory plane in which the desired number is located. The three resulting enabling signals are applied to the inhibit current driver 20 where each signal initiates a neutralizing process for the memory plane 16 to which it is connected. This neutralizing process may generally comprise any of the inhibiting or neutralizing processes common to the state of the art.

The timing pulses are again admitted into the memory system through the timing "and" gate 52 in a similar manner as admitted during phase one. These timing pulses are applied not only to the address counter 8 which operates in a similar manner as during phase one, but also to an X-axis drive "and" gate 68 and a Y-axis drive "and" gate 70.

The second phase enabling signal from the phase matrix circuit 38 is applied to a three phase "or" gate 72, a two phase "or" gate 74, and to the second phase output gate 14 by way of the line 76. The three phase "or" gate 72 has three inputs from the phase matrix circuit 38 corresponding to the second, third, and fourth phases of operation. Whichever of the three enabling signals is present is passed through the gate 72 and is applied to the X-axis drive "and" gate 68.

The X-axis drive "and" gate 68 has two input signals, one of which is an enabling signal from the three phase "or" gate 72 and the other is a train of clock pulses from the input "and" gate 52. The clock pulses passing through the gate 68 are applied to the X-axis bi-directional current steering switch 18 and advance this switch one "row" for each timing pulse applied thereto. The number of "rows" advanced in this manner is controlled by the number of timing pulses required to advance the address counter 8 to its zero condition. When the zero condition is detected by the zero matrix circuit 55, an enabling pulse is available at the output of the detect zero matrix and is applied to the Y-axis drive "and" gate 70.

The Y-axis drive "and" gate 70 has two input signals, one of which is an enabling pulse from the detect zero matrix 62, and the other a train of timing pulses from the timing "and" gate 52.

Timing pulses are now simultaneously passed through both the X-axis gate 68 and the Y-axis gate 70, and a "word" is interrogated from one of the memory planes 16 by the two bi-directional current steering switches. The inhibit current driver 20 selects the one memory plane in which the word is located. The requirement of this circuit is that it neutralize the interrogation currents flowing through all the memory planes 16 except the one plane of which the desired "word" is located. As each bit of the memory "word" is interrogated it is detected by the sense amplifier 24 and is applied to the second phase output gate 14, the third phase output gate 26, and a rewrite control "and" gate 78.

The second phase output gate 14 has two input signals, one of which is an enabling pulse from the diode gate phase matrix 38 which is only available during phase two of operation, and the other a series of signals which represent the contents of the memory from the interrogated "word." The output of the gate 14 is applied to the arithmetic register 12 where it is temporarily stored, and then placed in a memory register.

Concurrent with its application to the second phase output gate 14, each interrogated bit is applied to the rewrite control "and" gate 78. This gate has a second enabling input from the two phase "or" gate 74. This enabling pulse is available only during the second and third phases of each operation. This enabling pulse allows the output of the sense amplifier 24 to control the rewrite operation of the bi-directional current steering switches 18 and 22 during phases two and three of each operation. Therefore, the interrogated "word" is rewritten in a memory plane bit by bit after its interrogation.

When the Y-axis bi-directional current steering switch 22 has interrogated all the "columns" of the memory plane 16 it applies a pulse to a reset "and" gate 80. The reset "and" gate 80 has two input signals, one of which is an enabling signal from the three phase "or" gate 72, and the other the reset pulse from the switch 22.

The output of the reset "and" gate 80 is applied to the reset "or" gate 54 whose output is used to reset the start flip-flop 30 to its second stable state, thereby effecting the removal of the enabling pulse from the timing "and" gate 52 so that timing pulses are no longer admitted into the system. The output from the reset "or" gate 54 is also applied to the X-axis bi-directional current steering switch 18 as a reset pulse resetting the switch to its normal starting position.

The next signal from the tape reader 2 is a tape ready signal indicating the beginning of the third phase of operation. During the third phase of operation, a second "word" is selected from a memory plane 16 in a manner similar to the selection of the first "word." The only differences are that the three phase "or" gate 72 and the two phase "or" gate 74 are enabled by the diode gate phase matrix by way of the line 82, and that the same enabling signal is applied to the third phase output gate 26 instead of to the gate 14. A "word" is therefore interrogated from one of the memory planes 16 and stored in the arithmetic register 12.

To complete the third phase of operation, the arithmetic register 12 and the memory register are operated simultaneously, in conjunction with the arithmetic logic (not shown), to perform the operation specified by the operation decode circuit 6. The result or answer, appears bit by bit in the arithmetic register 12.

During the fourth phase of operation this answer must be transferred from the register 12 into a preselected "word" area of one of the memory planes. The address of this "word" is determined in the same manner as the address was determined to locate the words during phases two and three. The only difference between phase four and phases two and three is that the control of the rewrite portion of the interrogation process is no longer under the control of the sense amplifier 24 via the rewrite control "and" gate 78, but rather is under the control of the four phase output gate 28. This gate 28 has two input signals, one of which is an enabling pulse from the diode gate phase matrix 38 which is available only during the fourth phase of operation, and the other the series of bits of information to be inserted into the selected address in the memory. The input pulses from the register 12 control the operation of the rewrite process so that the accumulated answer is inserted into its preselected address.

At the completion of this phase operation, the system is ready to begin anew a second operation. The type of operation is determined by information on the paper tape which will again control the beginning and ending of all phases of operation.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims the instant invention may be practiced in a manner otherwise than is specifically described herein.

What is claimed is:

1. In combination with a plurality of interconnected memory planes, a memory control and access system comprising:

a source of control and instruction signals contained on a prepunched paper tape,
a tape reader,
a phase decode circuit connected to the tape reader,
an operation decode circuit connected to said phase decode circuit,
an address counter circuit connected to said tape reader,
an inhibit decode circuit in parallel connection with said address counter, said address counter circuit and said inhibit decode circuit being connected in parallel with said phase decode circuit,
a second phase output circuit,
a third phase output circuit,
a fourth phase output circuit connected to said phase decode circuit,
a pair of bi-directional current steering switches connected to said fourth phase output circuit and to said address counter, one of said steering switches being connected to one axis of the first of said memory planes and the other of said steering switches being connected to the other axis of the first of said memory planes,
an inhibit current driver connected in series relationship between each of the memory planes and the inhibit decode circuit,
a sense amplifier connected in series relationship between each of the memory planes, said second phase output circuit and said third phase output circuit, and
an arithmetic register connected to said third phase output circuit, said second phase output circuit, said fourth phase output circuit and said operation decode circuit.

2. The invention as recited in claim 1, wherein said plurality of interconnected memory planes each include a portion thereof capable of serving as an auxiliary arithmetic register.

3. The invention as set forth in claim 2, wherein said arithmetic register is the sole arithmetic register employed external to said plurality of interconnected memory planes.

4. The invention of claim 2, wherein the portion of each said memory plane capable of serving as an arithmetic register comprises the center diagonal portion thereof.

5. The invention of claim 1, wherein said arithmetic register is the sole arithmetic register employed external to said plurality of interconnected memory planes.

6. A memory control and access system including:

a pair of bi-directional current steering switches,
a plurality of interconnected memory planes, the first of which is connected at one of its axes to one of said current steering switches and at the other of its axes to the other of said current steering switches, whereby said memory planes will be serially driven by said current steering switches, a source of control and instruction signals comprising a prepunched paper tape, means for interpreting the signals contained in said paper tape one at a time, a phase decode circuit connected at its input to said paper tape signal interpreting means for receiving signals therefrom indicative of the commencement of successive phases of operation, an operation decode circuit connected at its input to said phase decode circuit and said paper tape signal interpreting means so as to receive enabling signals from said phase decode circuit and instruction and address signals from said paper tape signal interpreting means, an arithmetic register external to said plurality of memory planes and connected to said operation decode circuit so as to receive appropriate signals therefrom enabling said register to perform selected arithmetic operations, an address counter connected at its input to said phase decode circuit and said paper tape signal interpreting means and at its output to each of said pair of bi-directional current steering switches, an inhibit decode circuit connected at its input to said phase decode circuit and said paper tape signal interpreting means, and an inhibit current driver connected to said inhibit decode circuit and to each of said plurality of memory planes, whereby in response to signals from said phase decode circuit and said paper tape signal interpreting means said inhibit decode circuit will cause said inhibit current driver to neutralize all of the memory planes except the one containing a desired word and said address counter will first drive one of said pair of bi-directional current steering switches to the correct row position of said desired word and then proceed to simultaneously drive both of said pair of bi-directional current steering switches so as to cause the desired word to be interrogated.

7. The invention as set forth in claim 6, wherein said plurality of interconnected memory planes each include a portion thereof capable of serving as an arithmetic register.

8. The invention as set forth in claim 7, wherein the portion of each said memory plane capable of serving as an arithmetic register comprises the center diagonal portion thereof.

9. In a memory control and access system the combination including:

a pair of bi-directional current steering switches, a plurality of interconnected memory planes the first of which is connected at one of its axes to one of said current steering switches and at the other of its axes to the other of said current steering switches, whereby said memory planes will be serially driven by said current steering switches, a source of control and instruction signals, means for interpreting said control and instruction signals, an operation decode circuit connected to said signal interpreting means and capable of receiving instruction and address signals therefrom, an arithmetic register external to said plurality of memory planes and connected to said operation decode circuit so as to receive appropriate signals therefrom enabling said register to perform selected arithmetic operations, an address counter connected at its input to said phase decode circuit and said signal interpreting means and at its output to each of said pair of bi-directional current steering switches, an inhibit decode circuit connected at its input to said phase decode circuit and said signal interpreting means, and an inhibit current driver connected to said inhibit decode circuit and to each of said plurality of memory planes, whereby in response to signals from said signal interpreting means said inhibit decode circuit will cause said inhibit current driver to neutralize all of the memory planes except the one containing a desired word and said address counter will first drive one of said pair of bi-directional current steering switches to the correct row position of said desired word and then proceed to simultaneously drive both of said pair of bi-directional current steering switches so as to cause the desired word to be interrogated.

10. The invention as set forth in claim 9, wherein said plurality of interconnected memory planes each include a portion thereof capable of serving as an arithmetic register.

11. The invention as recited in claim 10, wherein the portion of each said memory plane capable of serving as an arithmetic register comprises the center diagonal portion thereof.

12. The invention as recited in claim 9, wherein said source of control and instruction signals is external to said plurality of interconnected memory planes and is capable of storing control and instructional information for a virtually unlimited time.

13. A memory control and access system, including:

a source of information signals, a plurality of interconnected memory planes, an arithmetic register capable of receiving arithmetic information from said plurality of memory planes and capable of receiving signals from said source of information signals, means for adapting a portion of each of said memory planes to function as an auxiliary arithmetic register; and a pair of bi-directional current steering switches each connected to the first of said plurality of memory planes whereby in response to signals from said source of information signals said bi-directional current steering switches will interrogate said plurality of memory planes word by word.

14. The invention according to claim 13, wherein said plurality of memory planes are serially driven by said bi-directional current steering switches.

15. The invention as set forth in claim 13, wherein said arithmetic register is the sole arithmetic register employed external to said plurality of interconnected memory planes.

16. The invention as recited in claim 15, wherein the portion of each said memory plane capable of serving as an arithmetic register comprises the center diagonal portion thereof.

17. The invention according to claim 15, additionally including means for supplying neutralizing currents to all but a selected one of said plurality of memory planes in response to signals from said source of information and control signals.

18. The invention of claim 17, wherein said source of information and control signals includes a prepunched paper tape.

19. A memory control and access system, including:

a plurality of interconnected memory planes each comprising a portion thereof which functions as an arithmetic register and each capable of storing a plurality of words, an arithmetic register external to said plurality of interconnected memory planes, means for instructing said memory control and access system as to operations to be performed, means for selecting a first word from one of said plurality of memory planes and transferring said word to said arithmetic register portion of one of said memory planes, means for selecting a second word from one of said plurality of memory planes and transferring said word to said external arithmetic register, means for operating said external arithmetic register in conjunction with said arithmetic register portion of one of said memory planes to perform the operations specified by said instructing means and obtain a solution, and means for placing and storing said solution in said plurality of interconnected memory planes.

20. The invention according to claim 19, additionally comprising means for supplying neutralizing currents to all but a selected one of said plurality of memory planes in response to signals from said instructing means.

21. The invention as set forth in claim 20, wherein said instructing means includes a prepunched paper tape.

22. The invention in accordance with claim 20, wherein said first and second word selection means include a pair of bi-directional current steering switches connected to said plurality of memory planes whereby said memory planes may be serially driven thereby.

23. The invention as set forth in claim 22, wherein said arithmetic register external to said plurality of interconnected memory planes is the sole such arithmetic register.

24. The invention according to claim 22, wherein the portion of each said memory plane capable of serving as an arithmetic register comprises the center diagonal portion thereof.

25. The invention as recited in claim 24, wherein said instructing means includes a prepunched paper tape having coded signals thereon capable of being read by said instructing means one at a time and directly sent to appropriate portions of said memory control and access system without being first stored in said plurality of memory planes.

26. The invention as recited in claim 19, wherein said arithmetic register external to said plurality of interconnected memory planes is the sole such arithmetic register.

27. The invention according to claim 26, wherein the portion of each said memory plane capable of serving as an arithmetic register comprises the center diagonal portion thereof.

References Cited

UNITED STATES PATENTS

| | | | |
|---|---|---|---|
| 3,061,192 | 10/1962 | Terzian | 235—157 |
| 3,296,604 | 1/1967 | Perschy | 340—174 |

PAUL J. HENON, *Primary Examiner.*

O. E. TODD, *Assistant Examiner.*